(12) United States Patent
Lawrence et al.

(10) Patent No.: US 11,440,603 B2
(45) Date of Patent: Sep. 13, 2022

(54) MOTORCYCLE KICKSTAND SUPPORT PLATE ASSEMBLY

(71) Applicants: Don Lawrence, Mission (CA); Donna Lawrence, Mission (CA)

(72) Inventors: Don Lawrence, Mission (CA); Donna Lawrence, Mission (CA)

(*) Notice: Subject to any disclaimer, the term of this patent is extended or adjusted under 35 U.S.C. 154(b) by 104 days.

(21) Appl. No.: 17/156,697

(22) Filed: Jan. 25, 2021

(65) Prior Publication Data

US 2022/0234666 A1    Jul. 28, 2022

(51) Int. Cl.
*B62H 1/02* (2006.01)
*B62H 1/06* (2006.01)

(52) U.S. Cl.
CPC ............... *B62H 1/06* (2013.01); *B62H 1/02* (2013.01); *B62H 2700/00* (2013.01)

(58) Field of Classification Search
CPC .............................. B62H 1/02; B62H 2700/00
USPC ........................................................ 280/293
See application file for complete search history.

(56) References Cited

U.S. PATENT DOCUMENTS

| 4,474,387 | A | * | 10/1984 | Maranell | B62H 1/00 |
| | | | | | 254/DIG. 1 |
| 5,484,153 | A | * | 1/1996 | Ricciardi | B62H 1/02 |
| | | | | | 248/346.5 |
| 5,503,420 | A | * | 4/1996 | Consiglio | B60R 13/105 |
| | | | | | 280/288.4 |
| 9,211,926 | B1 | * | 12/2015 | Blaeser | B62J 50/40 |
| 10,167,030 | B1 | * | 1/2019 | Smith | B62H 1/02 |
| 10,315,717 | B2 | * | 6/2019 | Risley | B62H 1/02 |

\* cited by examiner

*Primary Examiner* — Kevin Hurley
*Assistant Examiner* — Hosam Shabara
(74) *Attorney, Agent, or Firm* — Orin Del Vecchio

(57) ABSTRACT

A motorcycle kickstand support assembly that is configured to be mounted adjacent to a license plate on a motorcycle wherein a kickstand support plate is releasably secured therein. The kickstand support plate of the present invention is configured to be placed on a soft ground and receive the end of the kickstand thereon so as to maintain the motorcycle in an upright position. The present invention includes a housing having a plurality of walls forming an interior volume. The kickstand support plate is inserted into the housing and is biasly positioned within the interior volume utilizing wedge member present proximate the rear end of the housing. A pair of shoulder members engage locking tabs and the spring mounted wedge member keeps the shoulder members biased against the locking tabs so as to secure the kickstand mounting plate.

15 Claims, 5 Drawing Sheets

MOTORCYCLE KICKSTAND SUPPORT PLATE ASSEMBLY

FIELD OF THE INVENTION

The present invention relates generally to motorcycle accessories, more specifically but not by way of limitation, a motorcycle kickstand plate assembly that includes a housing mounted proximate the license plate mount of the motorcycle wherein the housing includes a cavity configured to releasably secure therein a plate suitable to have a kickstand end superposed thereon.

BACKGROUND

Millions of people regularly ride motorcycles on a regular basis. Motorcycles are routinely utilized for commuter vehicles due to their favorable gas mileage but they are also a recreational pastime for millions of riders. There are many different styles of motorcycles but they can be categorized at a high level between off-road and on-road motorcycles. For the latter, when the motorcycle is parked there are several common methods and/or devices to maintain the motorcycle in an upright position. Many motorcycles will use a stand or an integrated center stand to position the motorcycle in a safe upright and stable position. Another extremely common device utilized to maintain a motorcycle in an upright position when not in use is a kickstand.

As is known in the art kickstands are hingedly mounted to the bottom portion of the frame of the motorcycle in approximately the center area thereof. The kickstand is manufactured from metal and has an end that will often have a small flare or similar structure to increase the surface area of the kickstand rod. A problem exists when utilizing a conventional kickstand on support surfaces that are soft such as but not limited to dirt ground. The combination of the weight of the motorcycle and the soft ground will often cause the motorcycle to lean and eventually fall over. Many riders will carry small discs or similar items to place under the end of the kickstand. The carrying of these items however is not convenient.

It is intended within the scope of the present invention to provide a motorcycle kickstand support plate assembly that includes a housing mounted to the motorcycle wherein the housing includes a cavity configured to releasably secure a kickstand support plate so as to provide access thereto when needed by a motorcycle rider.

SUMMARY OF THE INVENTION

It is the object of the present invention to provide a motorcycle kickstand support plate assembly configured to be secured to a motorcycle wherein the present invention includes a housing that can be secured proximate the license plate mount of a motorcycle.

Another object of the present invention is to provide a motorcycle kickstand support plate assembly configured to releasably secure a kickstand support plate for access when needed by a motorcycle rider wherein the kickstand support plate of the present invention is slidably engaged within the cavity of the housing.

A further object of the present invention is to provide a motorcycle kickstand support plate assembly configured to be secured to a motorcycle wherein the kickstand support plate is planar in manner having a front end and a rear edge.

Still another object of the present invention is to provide a motorcycle kickstand support plate assembly configured to releasably secure a kickstand support plate for access when needed by a motorcycle rider wherein the kickstand support plate member is biasly secured within the cavity of the housing utilizing springs.

An additional object of the present invention is to provide a motorcycle kickstand support plate assembly configured to be secured to a motorcycle wherein the kickstand support plate includes opposing shoulder members along the front edge thereof distally located.

Yet a further object of the present invention is to provide a motorcycle kickstand support plate assembly configured to releasably secure a kickstand support plate for access when needed by a motorcycle rider wherein the kickstand support plate further includes an engagement tab extending outward from the front edge and axially aligned therewith.

Another object of the present invention is to provide a motorcycle kickstand support plate assembly configured to be secured to a motorcycle wherein the housing is manufactured from mateable halves and includes spring mounts along the rear wall thereof.

An alternate object of the present invention is to provide a motorcycle kickstand support plate assembly configured to releasably secure a kickstand support plate for access when needed by a motorcycle rider wherein the rear wall of the housing includes recesses along the rear wall thereof configured to have spring mounts therein.

Still a further object of the present invention is to provide a motorcycle kickstand support plate assembly configured to be secured to a motorcycle wherein the housing further includes a lock tab formed on the front edge thereof.

To the accomplishment of the above and related objects the present invention may be embodied in the form illustrated in the accompanying drawings. Attention is called to the fact that the drawings are illustrative only. Variations are contemplated as being a part of the present invention, limited only by the scope of the claims.

BRIEF DESCRIPTION OF THE DRAWINGS

A more complete understanding of the present invention may be had by reference to the following Detailed Description and appended claims when taken in conjunction with the accompanying Drawings wherein:

DETAILED DESCRIPTION

Figure 1:
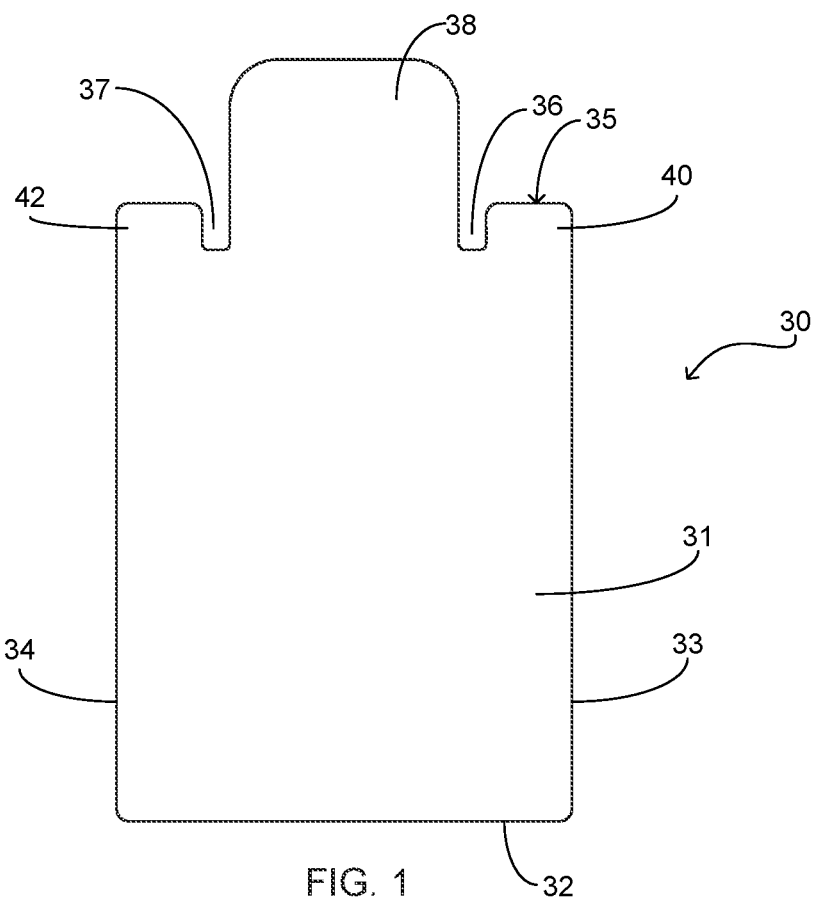
FIG. 1 is a top view of the kickstand support plate.
Figure 2:
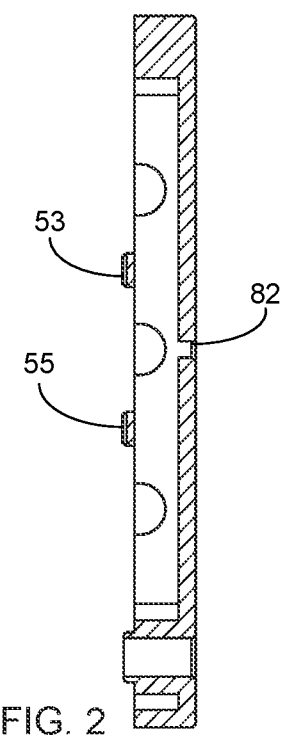
FIG. 2 is an end view of a half of the housing of the present invention.
Figure 3:
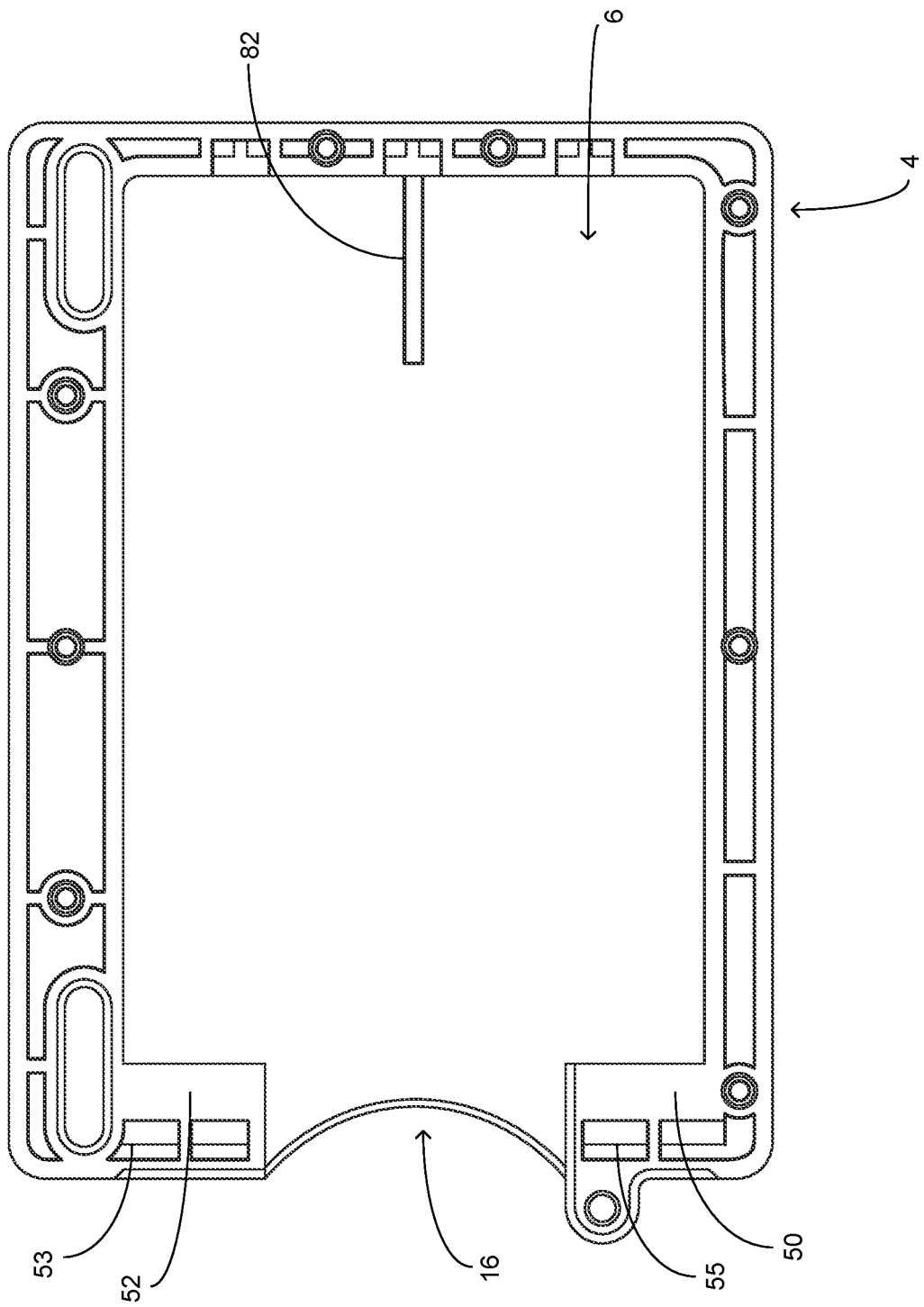
FIG. 3 is a cross sectional view of the housing of the present invention.
Figure 4:
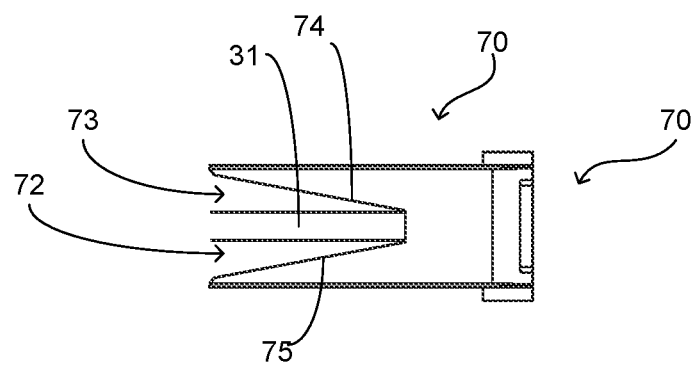
FIG. 4 is a side view of the wedge member disposed within housing.
Figure 5:
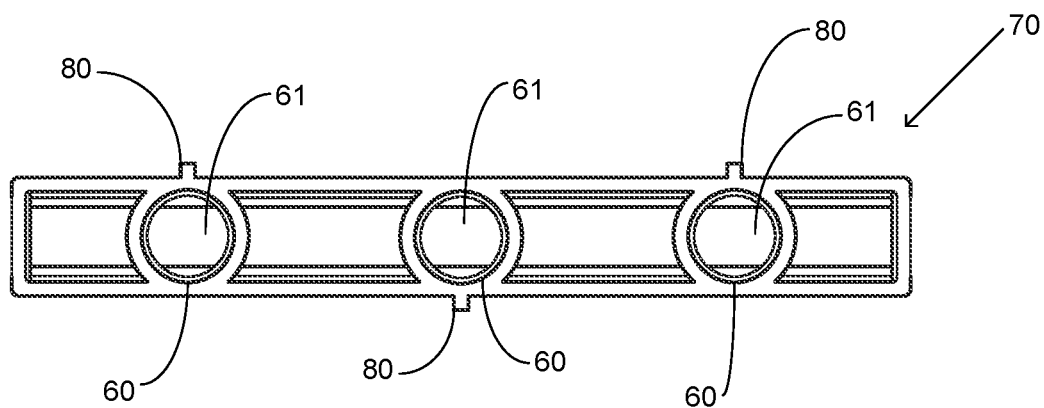
FIG. 5 is the rear side of the wedge member.
Figure 6:
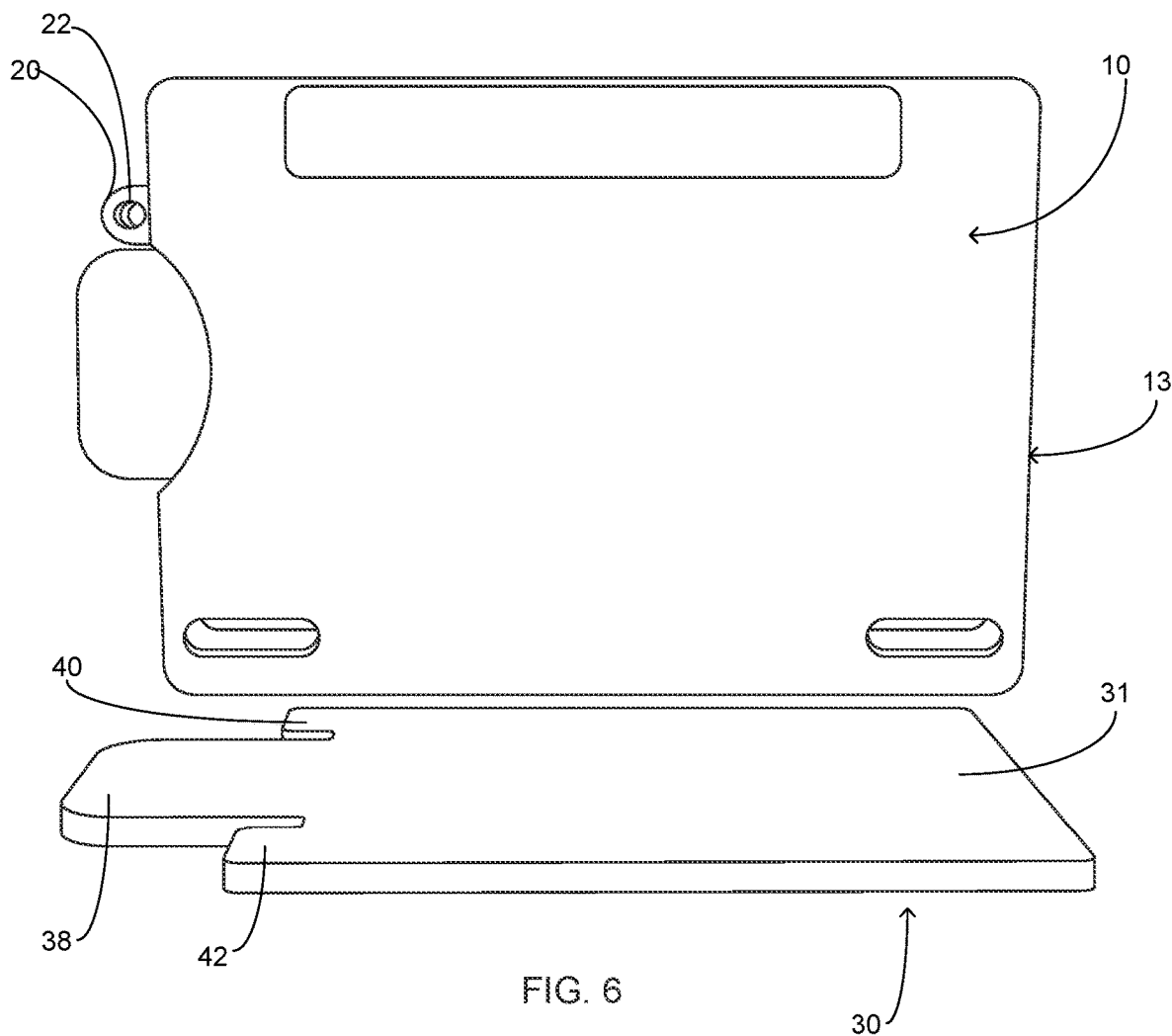
FIG. 6 is a rear view of the housing with the kickstand support plate removed therefrom.
Figure 7:
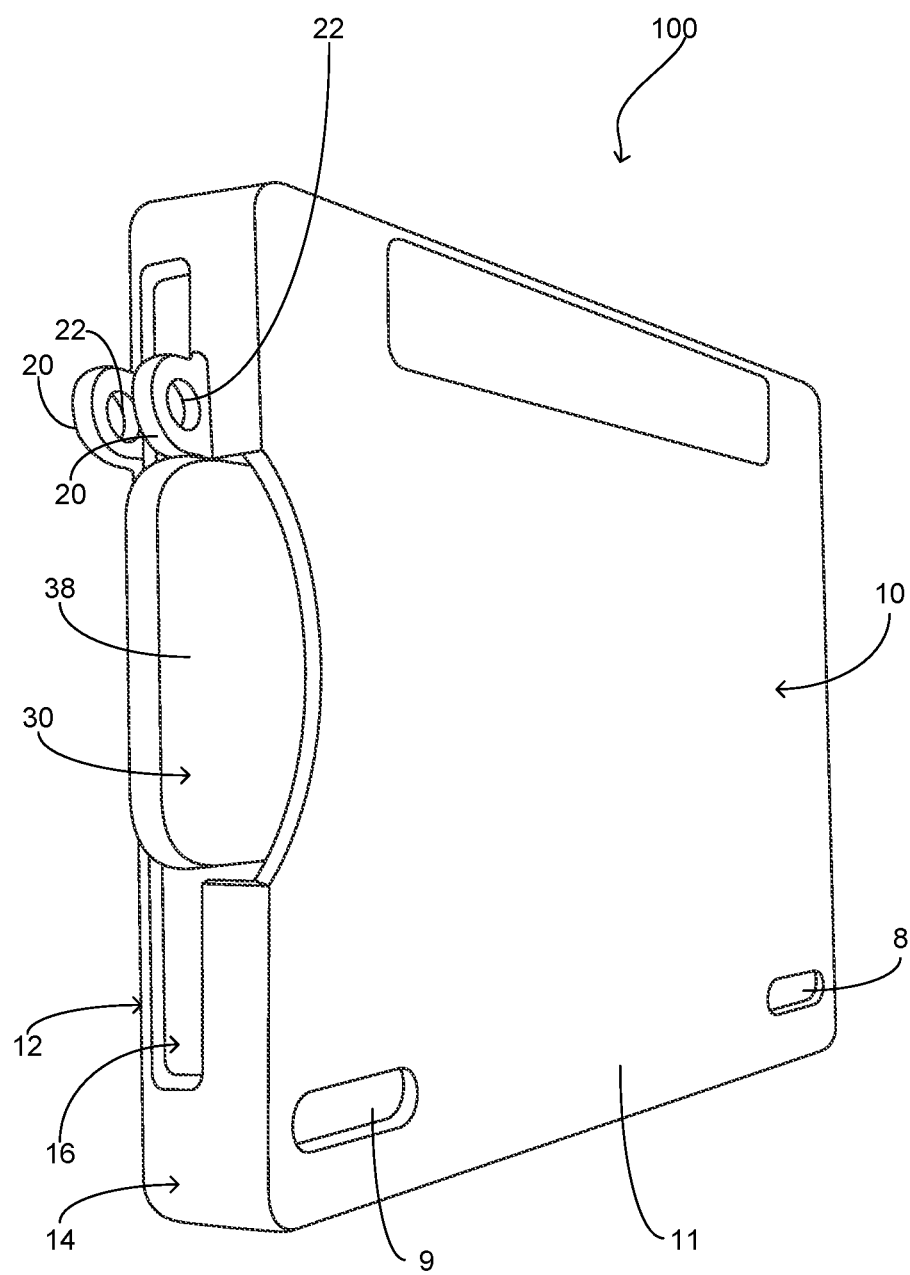
FIG. 7 is a front perspective view of a preferred embodiment of the present invention.

References now to the drawings submitted herewith, wherein various elements depicted therein are not necessarily drawn to scale and wherein through the views and figures like elements are referenced with identical reference numerals, there is illustrated a motorcycle kickstand plate assembly 100 constructed according to the principles of the present invention.

An embodiment of the present invention is discussed herein with reference to the figures submitted herewith.

Those skilled in the art will understand that the detailed description herein with respect to these figures is for explanatory purposes and that it is contemplated within the scope of the present invention that alternative embodiments are plausible. By way of example but not by way of limitation, those having skill in the art in light of the present teachings of the present invention will recognize a plurality of alternate and suitable approaches dependent upon the needs of the particular application to implement the functionality of any given detail described herein, beyond that of the particular implementation choices in the embodiment described herein. Various modifications and embodiments are within the scope of the present invention.

It is to be further understood that the present invention is not limited to the particular methodology, materials, uses and applications described herein, as these may vary. Furthermore, it is also to be understood that the terminology used herein is used for the purpose of describing particular embodiments only, and is not intended to limit the scope of the present invention. It must be noted that as used herein and in the claims, the singular forms "a", "an" and "the" include the plural reference unless the context clearly dictates otherwise. Thus, for example, a reference to "an element" is a reference to one or more elements and includes equivalents thereof known to those skilled in the art. All conjunctions used are to be understood in the most inclusive sense possible. Thus, the word "or" should be understood as having the definition of a logical "or" rather than that of a logical "exclusive or" unless the context clearly necessitates otherwise. Structures described herein are to be understood also to refer to functional equivalents of such structures. Language that may be construed to express approximation should be so understood unless the context clearly dictates otherwise.

References to "one embodiment", "an embodiment", "exemplary embodiments", and the like may indicate that the embodiment(s) of the invention so described may include a particular feature, structure or characteristic, but not every embodiment necessarily includes the particular feature, structure or characteristic.

Now referring to the Figures submitted herewith, the motorcycle kickstand plate assembly 100 is configured to be operably coupled to a motorcycle in order to provide a kickstand support plate 30 and make available to a motorcycle rider. The housing 10 of the present invention in a preferred embodiment is mounted adjacent to the license plate mounting area of a motorcycle utilizing apertures 8, 9 and fasteners such as but not limited to bolts. It should be understood within the scope of the present invention that the housing 10 could further be configured to mount to a motorcycle and have a license plate mounted directly thereto. The housing 10 is manufactured from a durable rigid material such as but not limited to plastic. The housing is rectangular in shape so as to be mateably shaped with a conventional license plate or license plate mount. While the housing 10 is illustrated as being rectangular in shape herein, it is contemplated within the scope of the present invention that the housing 10 could be formed in alternate shapes so as to releasably secure therein a kickstand support plate 30 of a similar shape.

The housing 10 includes a first wall 11, a second wall 12, a rear wall 13 and a front wall 14 all being integrally formed to create an interior volume of suitable size to accommodate the kickstand support plate therein. Formed in the front wall 14 is opening 16, wherein the opening 16 is of suitable size to allow the kickstand support plate 30 to be journaled thereinto for storage within the housing 10. The housing 10 in a preferred embodiment is manufactured in mateable halves wherein the mateable halves are operably coupled to complete the structure of the housing 10. FIG. 1 herein provides an exemplary view of a mateable half of the housing 10. It is contemplated within the scope of the present invention that the housing 10 could be manufactured utilizing a suitable technique such as but not limited to injection molding. The housing 10 has formed on the front wall 14 thereof locking tabs 20 wherein the locking tabs 20 extend outward from the front wall 14. The locking tabs 20 are adjacent each other and parallel in configuration having a void 21 therebetween. The locking tabs 20 include an aperture 22 wherein the aperture 22 is suitable in size to accommodate a padlock or other securing element that is operable to inhibit the kickstand support plate 30 from being removed from the housing 10.

The kickstand support plate 30 is illustrated herein in FIG. 1. The kickstand support plate 30 includes a body 31 that is manufactured from a durable rigid material such as but not limited to plastic or metal. The kickstand support plate 30 is planar in manner and rectangular in shape so as to mateably insert into the interior volume of the housing 10. The kickstand support plate 30 includes a rear edge 32 and opposing lateral side edges 33,34. The front edge 35 includes a first valley 36 and second valley 37 wherein the first valley 36 and second valley 37 are opposedly located with respect to the engagement tab 38. Engagement tab 38 protrudes outward from the housing 10 ensuing the kickstand support plate 30 being releasably secured into the interior volume of the housing 10 providing an element to grasp the kickstand support plate 30. The front edge 35 further includes a first shoulder member 40 and a second shoulder member 42 distally located on the body 31 across the width thereof. The first shoulder member 40 and second shoulder member 42 are formed in part by first valley 36 and second valley 37 respectively. The first shoulder member 40 and second should member 42 are configured to engage tabs 53,55 on the retention members 50,52. While the body 31 of the kickstand support plate 30 is illustrated herein as having a first shoulder member 40 and a second should member 42, it is contemplated within the scope of the present invention that the body 31 could have one shoulder member configured to engage a retention member so as to secure the kickstand support plate 30 within the interior volume of the housing 10.

The interior volume 6 of the housing 10 includes a retention members 50, 52 formed proximate the opening 16. Subsequent the kickstand support plate 30 being inserted into the interior volume 6, the kickstand support plate 30 is biased in a lateral motion so as to move the front edge 35 from being axially aligned with the opening 16. Once the kickstand support plate 30 is biased laterally, the first shoulder member 40 and second shoulder member 42 are forced against the tabs 53,55 by springs 60 as will be further discussed herein. The wedge member 70 is biasly secured proximate the rear end 4 of the housing 10. The wedge member 70 incorporates springs 60 and spring mounts 61 that provide an inwards-outwards movement thereof. Wedge member 70 includes receiving slot 72 that has an opening 73 formed by opposing angular sidewalls 74, 75. Angular sidewalls 74,75 have the illustrated orientation in the preferred embodiment so as to permit improved receipt and engagement of the rear edge 32 of the body 31. The receiving slot 72 is configured to engage the rear edge 32 of the kickstand support plate 30. As the kickstand support plate 30 is inserted into the interior volume 6 of the housing 10, the spring loaded wedge member 70 receives the rear edge 32 and allows a rearwards movement of the body 31 towards the rear end 4. This motion of travel is sufficient so as to allow the first shoulder member 40 and second should member 50 to egress beyond the retention members 50,52. A lateral force is then applied to the engagement tab 38 so as to laterally move the housing 10. Release of the inward pressure on the kickstand support plate 30 then provides engagement of the first shoulder member 40 and second shoulder member 42 with the retention members 50, 52 and the tabs 53,55 formed thereon so as to releasably secure the kickstand support plate 30 within the interior volume 6 of the housing 10.

The springs 60 provide the necessary bias in an outward direction toward the opening 16 so as to maintain the first shoulder member 40 and second shoulder member 42 against the tabs 53,55. Wedge member 70 is formed to be the full height of the interior volume 6 of the housing and includes alignment pins 80 that are configured to operably coupled alignment slots 82 so as to facilitate linear travel thereof. It should be understood within the scope of the present invention that the motorcycle kickstand plate assembly 100 could employ alternate quantities of alignment pins 80 and alignment slots 82. It should be understood within the scope of the present invention that the wedge member 70 could be biasly mounted with alternate quantities of springs or employ an alternate mounting technique so as to accomplish the desired biased mounting thereof so as to apply the desired force to the body 31. It should be understood within the scope of the present invention that alternate quantities of tabs could be deployed on the retention members 50,52 and achieve the desired objective discussed herein.

In the preceding detailed description, reference has been made to the accompanying drawings that form a part hereof, and in which are shown by way of illustration specific embodiments in which the invention may be practiced. These embodiments, and certain variants thereof, have been described in sufficient detail to enable those skilled in the art to practice the invention. It is to be understood that other suitable embodiments may be utilized and that logical changes may be made without departing from the spirit or scope of the invention. The description may omit certain information known to those skilled in the art. The preceding description is, therefore, not intended to be limited to the specific forms set forth herein, but on the contrary, it is intended to cover such alternatives, modifications, and equivalents, as can be reasonably included within the spirit and scope of the invention.

What is claimed is:

1. A motorcycle kickstand support assembly configured to be secured to a motorcycle wherein the motorcycle kickstand support assembly comprises:
   a housing, said housing having a plurality of walls integrally formed to create an interior volume, said housing having a front wall, said front wall having an opening formed therein, said opening providing access to said interior volume; and
   a kickstand support plate, said kickstand support plate being planar in manner, said kickstand support plate configured to be journaled through said opening of said housing and at least partially disposed within said interior volume of said housing, said kickstand support plate having at least one shoulder member on a front edge thereof, said shoulder member configured engage at least one tab formed in the interior volume of said housing proximate the opening thereof.

2. The motorcycle kickstand support assembly as recited in claim 1, and further including a wedge member, said wedge member being disposed within said interior volume of said housing, said wedge member being biasly mounted so as to provide an inward-outward movement thereof, said wedge member configured to receive a rear edge of the kickstand support plate.

3. The motorcycle kickstand support assembly as recited in claim 2, and further including a locking tab, said locking tab being formed on said housing proximate said opening, said locking tab extending outward from said housing and having an aperture therethrough.

4. The motorcycle kickstand support assembly as recited in claim 3, wherein said kickstand support plate further includes at least one valley, said at least one valley formed on the front edge of the kickstand support plate, said at least one valley formed adjacent said at least one shoulder.

5. The motorcycle kickstand support assembly as recited in claim 4, wherein said wedge member includes a slot, said slot operable to receive a rear edge of the kickstand support plate.

6. The motorcycle kickstand support assembly as recited in claim 5, wherein said slot of said wedge member includes opposing angular sidewalls operable to provide capture of the rear edge of the kickstand support plate.

7. The motorcycle kickstand support assembly as recited in claim 6, wherein said kickstand support plate further includes an engagement tab, said engagement tab extending beyond said front edge of said kickstand support plate, said engagement tab being outside of said interior volume of said housing subsequent said kickstand support plate being inserted into the interior volume of said housing.

8. A motorcycle kickstand support assembly configured to be mounted on a motorcycle proximate a license plate having an element as a part thereof suitable for superposing an end of a motorcycle kickstand thereon so as to support the motorcycle in an upright position on soft ground wherein the motorcycle kickstand support assembly comprises: a housing, said housing having a first wall, a second wall, a rear wall and a front wall integrally formed to create an interior volume, said housing having a rear end and a front end, said front wall having an opening formed therein providing access to said interior volume, said first wall and said second wall having an interior surface adjacent said interior volume, said housing include a locking tab formed on the front wall thereof, said housing being rectangular in shape; a kickstand support plate, said kickstand support plate having a body being planar in manner, said body being rectangular in shape, said body having a rear edge and a front edge, said body having opposing side edges, said body having a first shoulder member and a second shoulder member, said first shoulder member and said second shoulder member being proximate opposing side edges and distal to each other, said first shoulder having a valley formation adjacent thereto along said front edge, said second shoulder having a second valley formation on the front edge adjacent thereto, said body further including an engagement tab, said engagement tab integrally formed with said body, said engagement tab intermediate said first shoulder member and said second shoulder member; and a wedge member, said wedge member biasly mounted proximate said rear end of said housing within said interior volume, said wedge member configured to receive said rear edge of said body of said kickstand support plate.

9. The motorcycle kickstand support assembly configured to be mounted on a motorcycle proximate a license plate as recited in claim 8, wherein said housing further includes a first retention member, said first retention member being adjacent said opening of said front wall of said housing, said first retention member having a tab thereon, said tab configured to engage said first shoulder member so as to retain said body of said kickstand support plate within said interior volume of said housing.

10. The motorcycle kickstand support assembly configured to be mounted on a motorcycle proximate a license plate as recited in claim 9, wherein said housing further includes a second retention member, said second retention member being adjacent said opening of said front wall of said housing opposite said first retention member, said second retention member having a tab thereon, said tab of said second retention member configured to engage said second shoulder member so as to retain said body of said kickstand support plate within said interior volume of said housing.

11. The motorcycle kickstand support assembly configured to be mounted on a motorcycle proximate a license plate as recited in claim 10, wherein said wedge member further includes a receiving slot, said receiving slot configured to receive the rear edge of said body of said kickstand support plate.

12. The motorcycle kickstand support assembly configured to be mounted on a motorcycle proximate a license plate as recited in claim 11, wherein said receiving slot is formed with opposing angular sidewalls.

13. The motorcycle kickstand support assembly configured to be mounted on a motorcycle proximate a license plate as recited in claim 12, wherein said housing has at least one alignment slot formed on the interior surface of the first wall or second wall.

14. The motorcycle kickstand support assembly configured to be mounted on a motorcycle proximate a license plate as recited in claim 13, wherein said wedge member further includes at least one alignment pin configured to engage said at least one alignment slot.

15. The motorcycle kickstand support assembly configured to be mounted on a motorcycle proximate a license plate as recited in claim 14, wherein said engagement tab extends beyond said front wall of said housing subsequent said kickstand support plate being inserted into the interior volume of said housing.

* * * * *